United States Patent [19]
Bucher et al.

[11] Patent Number: 5,300,871
[45] Date of Patent: Apr. 5, 1994

[54] DUAL CAPACITOR SPEED CONTROL APPARATUS AND METHOD FOR ELECTRIC MOTOR

[75] Inventors: John C. Bucher, Coral Springs; Shih T. Wu, Lighthouse Point, both of Fla.; Ta-Yao Tao, Taipei, Taiwan

[73] Assignee: Chien Luen Industries Company, Ltd., Inc., Ft. Lauderdale, Fla.

[21] Appl. No.: 934,047

[22] Filed: Aug. 21, 1992

[51] Int. Cl.$^5$ ............................................. H02P 1/26
[52] U.S. Cl. ................................ 318/794; 318/779; 318/778; 318/795; 318/817
[58] Field of Search ............... 318/778, 779, 794, 795, 318/817

[56] References Cited

U.S. PATENT DOCUMENTS

| | | | |
|---|---|---|---|
| 4,408,150 | 10/1983 | Holston et al. | 318/779 |
| 4,465,960 | 8/1984 | Pfarrer | 318/779 |
| 4,782,278 | 11/1988 | Bossi et al. | 318/778 |
| 5,017,853 | 5/1991 | Chmiel | 318/778 |
| 5,192,887 | 3/1993 | Theis | 318/778 |

Primary Examiner—William M. Shoop, Jr.
Assistant Examiner—Karen Masih
Attorney, Agent, or Firm—Dominik, Stein, Saccocio, Reese, Colitz & Van Der Wall

[57] ABSTRACT

An induction motor speed control apparatus and method wherein various capacitors are switched in series with the auxiliary winding of an induction motor and, during such switching, the power source is disconnected from the main and auxiliary windings and the in-use capacitors are momentarily connected to the main winding to form a closed-loop discharge path through the main and auxiliary windings.

9 Claims, 4 Drawing Sheets

DUAL CAPACITOR SPEED CONTROL APPARATUS AND METHOD FOR ELECTRIC MOTOR

BACKGROUND OF THE INVENTION

1. Field of the Invention

This invention relates to induction motors. More particularly, this invention relates to speed control of induction motors employing switchable capacitors connected in series with the auxiliary/start winding of the motor.

2. Description of the Background Art

Conventional induction motors typically comprise a main winding and an auxiliary/start winding. A capacitor and a resistor are connected in series with the auxiliary winding. Voltage from an alternating current (AC) power source is applied across the windings by means of a switch which, for high speed operation, applies voltage across the main and auxiliary windings connected in parallel and, for low speed operation, applies voltage across only the main winding. Additional speed control can be obtained by switching in different capacitors into the auxiliary winding. U.S. Pat. No. 4,670,699 discloses various speed control techniques for induction motors wherein the capacitors in the auxiliary winding are selectively switched in and out of the auxiliary winding so as to achieve high, medium, and low speed operation.

As reflected in U.S. Pat. No. 4,670,699, the resistor connected with the capacitor(s) in the auxiliary winding provide a means for safely discharging the capacitor(s) when changing from one speed to another. Indeed, it has been known that without such a resistor, the capacitor(s) will not be safely discharged during switching thereby resulting in increased arcing during switching. Moreover, the need for such a resistor unnecessarily increases the manufacturing costs.

Therefore, it is an object of this invention to provide an induction motor speed control apparatus and method which overcomes the aforementioned inadequacies of the prior art controls and provides an improvement which is a significant contribution to the advancement of the induction motor art.

Another object of this invention is to provide speed control for induction motors by switching in various capacitors in the auxiliary winding of the motor and by providing means for discharging such capacitors during switching without employing a resistor connected in the auxiliary winding.

Another object of this invention is to provide speed control for induction motors wherein a switch is provided for selectively switching in various capacitors in series with the auxiliary winding of the motor for achieving multi-speed operation of the motor, the switch including means for disconnecting the power source from the in-use capacitor and, during such disconnection, momentarily connecting such capacitor to the main winding, allowing such capacitor to discharge through the main winding and the auxiliary winding, and then connecting the power source to one or more of the other capacitors or reconnecting the power source to such capacitor in parallel with one of the other capacitors.

Another object of this invention is to provide speed control for induction motors as described hereinabove, wherein the switch comprises a rotary switch having indexed positions corresponding to the "off" position and each position of speed control (e.g. "low", "medium" and "high"), configured in such a manner that each of the in-use capacitors in the auxiliary winding is momentarily disconnected from the power source and connected to the main winding as the switch is rotating from one of such positions to another.

The foregoing has outlined some of the more pertinent objects of the invention. These objects should be construed to be merely illustrative of some of the more prominent features and applications of the intended invention. Many other beneficial results can be obtained by applying the disclosed invention in a different manner or modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

SUMMARY OF THE INVENTION

For the purpose of summarizing this invention, this invention comprises an induction motor speed control apparatus and method. More particularly, the method of the invention comprises the steps of switching various capacitors in series with the auxiliary winding of an induction motor and, during such switching, disconnecting the power source from both windings and momentarily connecting the in-use capacitor(s) to the main winding to form a closed-loop discharge path through the windings. The discharge path through the windings allows the in-use capacitor(s) to safely discharge through the windings without the need of a discharge resistor.

The electrical circuit of the invention comprises a pair of capacitors connected to the auxiliary winding of an induction motor by means of a rotary switch which circuitously operates from an "off" position through "high", "medium", and "low" positions. More specifically, in the "high" speed position, the switch connects the power source across the main winding and across both capacitors (having a large and low capacitance value, e.g. 3 uf and 1.5 uf) in parallel to each other (to add such capacitance, e.g. 4.5 uf) and in series with the auxiliary winding. Upon switching from "high" to "medium" speed positions, the switch disconnects the power source from the windings and the capacitors, and then momentarily connects the capacitors to the main winding to form a closed-loop discharge path through the capacitors and both of the windings, allowing the capacitors to safely discharge through the windings. In the "medium" speed position, the switch connects the power source across the main winding and across the higher-value capacitor in series with the auxiliary winding. Upon switching from the "medium" to "low" speed positions, the switch disconnects the power source from both of the windings and the higher-value capacitor and then momentarily connects such capacitor to the main winding to form a closed-loop discharge path through the windings and that capacitor, thereby allowing such higher-value capacitor to safely discharge through the windings. When the switch is in the "low" speed position, the switch connects the power source across the main winding and the lower-value capacitor in series with the auxiliary winding. Upon switching from the "low" speed position to the "off" position, the switch disconnects the power source from the windings and then momentarily connects such capacitor to the main winding to form a closed-loop discharge path through the windings and that capacitor, thereby allowing such lower-value capacitor to safely discharge through the windings.

Notably, the motor speed control apparatus and method of this invention allows each capacitor being used to safely discharge through the windings of the motor, thereby eliminating the need for a discharge resistor. Manufacturing costs are therefore reduced. Thus, the motor speed control apparatus and method of this invention is particularly suitable for use in connection with ceiling fans and the like.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which.

Similar reference characters refer to similar parts throughout the several views of the drawings.

DETAILED DESCRIPTION OF THE PREFERRED EMBODIMENT

Figure 1A:
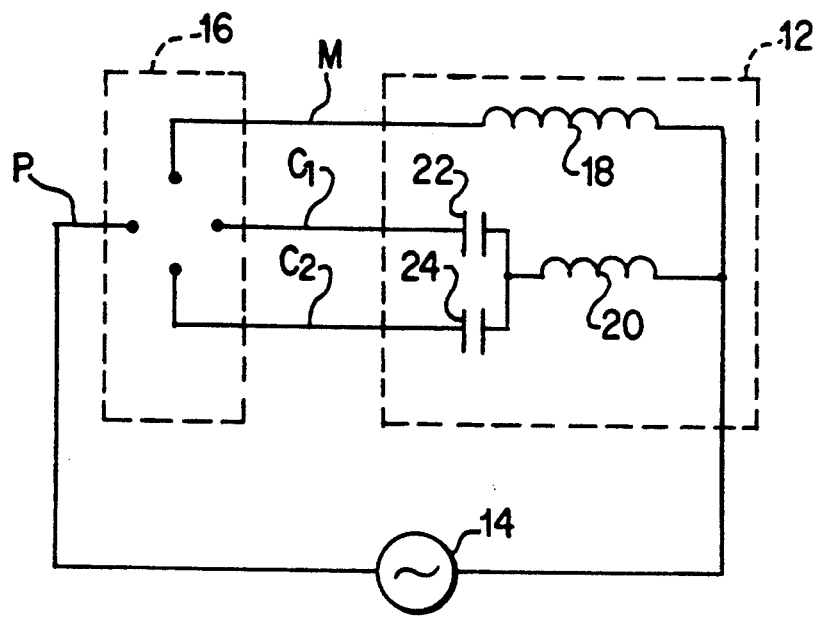
FIG. 1A is a schematic view of the induction motor speed control of the invention and FIG. 1B is a perspective view, partially exploded, of the rotary switch of the invention illustrating the four electrical leads emanating therefrom for connection to the power source and the main winding, and the higher-value and lower-value capacitors connected to the auxiliary winding of the motor.

Referring to FIG. 1A, the induction motor speed control 10 of the invention comprises an induction motor 12 which is electrically connected to a power source 14 by means of a switch 16. More particularly, the induction motor 12 comprises a main winding 18 having terminal end M and an auxiliary winding 20 to which is connected to a low-value and a high-value capacitor 22 and 24 (e.g. 1.5 uf and 3.0 uf) defining terminals $C_1$ and $C_2$. The terminals M, $C_1$ and $C_2$ are connected to the respective terminals of switch 16. The power source 14 is connected at one end of the windings 18 and 20 and to the power terminal P of the switch 16.

Figure 1B:
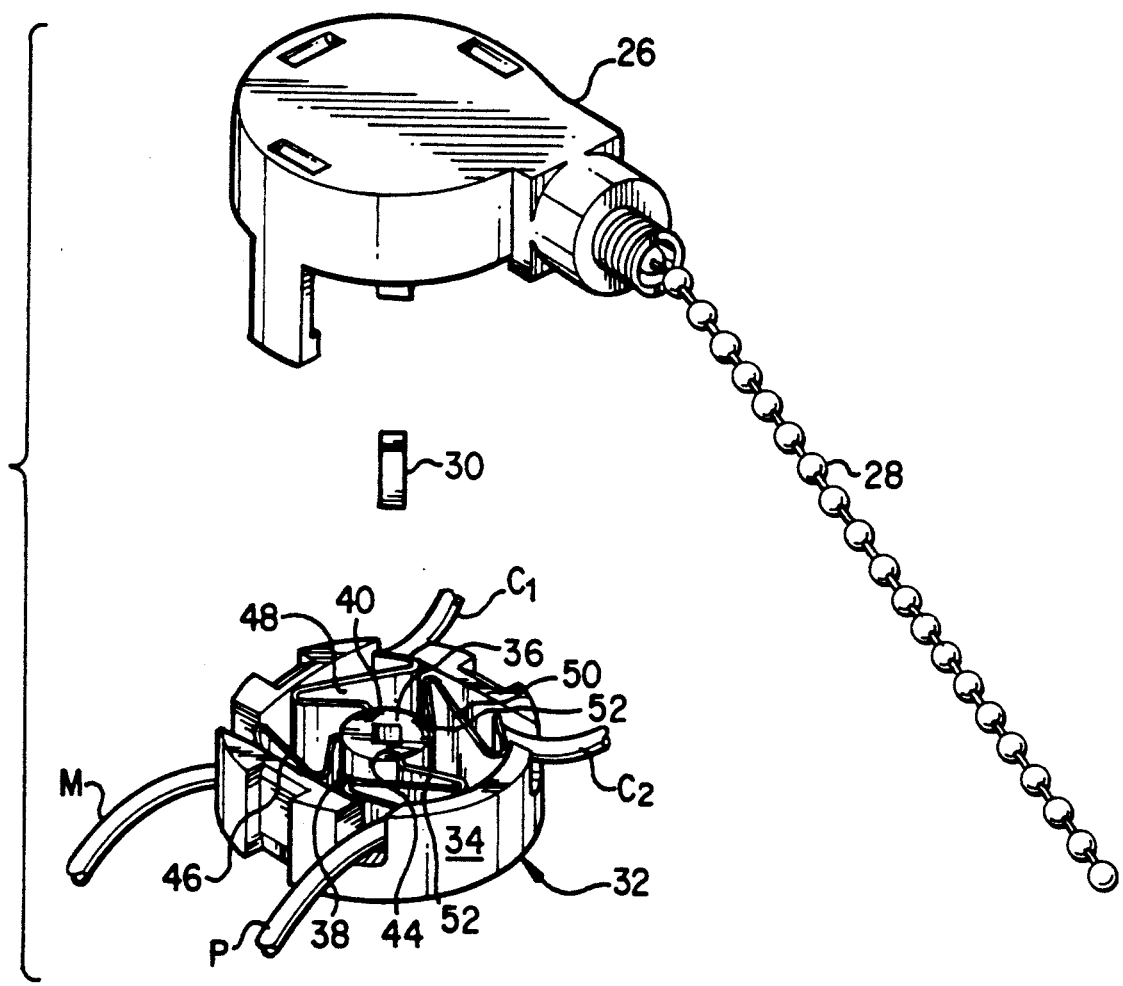

Switch 16 preferably comprises a rotary pull-chain switch as shown in FIG. 1B. More specifically, rotary switch 16 comprises a rotating mechanism 26 including pull-chain 28 which functions in the usual manner such that, upon each pull of the chain 28, the central shaft 30 of the mechanism 26 rotates precisely 90 degrees to rotate a switch mechanism 32 via shaft 30, thereby defining four preset positions of the switch mechanism 32. The switch mechanism 32 of the switch 16 comprises a housing 34 secured to the rotating mechanism 26. The shaft 30 of the rotating mechanism 26 engages into a rotatable contactor 36 which is rotatably secured within the housing 34.

Figure 2:
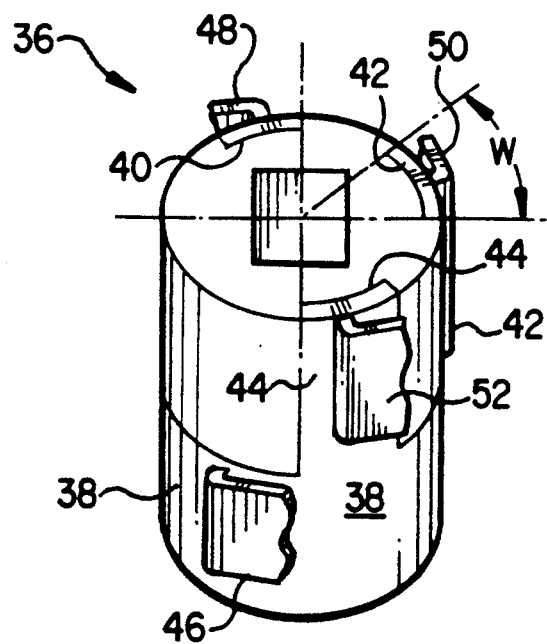
FIG. 2 is a perspective view of the rotatable contactor of the switch mechanism illustrating the power source spring contact positioned lower than the main winding spring contact and the two capacitor spring contacts.

As shown in FIG. 2, rotatable contactor 36 is composed of a dielectric material. A metal strip 38 is rigidly wrapped about the lower half of the entire circumference of the rotatable contactor 36 and includes three upstanding tabs 40, 42 and 44 which extend along the side of the upper half of the contactor 36. The width of the tabs 40–44 are the same, thereby defining the same angular width W about the outer circumference of the contactor 36. Furthermore, tab 42 is spaced exactly ninety degrees from tab 40 and tab 44 is spaced exactly ninety degrees from tab 42.

A spring contact 46 is operatively held within the housing 34 so as to remain in resilient contact with the metal strip 38 positioned about the lower portion of the rotatable contactor 36. Similar spring contacts 48, 50 and 52 are similarly retained within housing 34 so as to be in resilient contact with the upper portion of the rotatable connector 36 and the tabs 40, 42 and 44. The spring contacts 46–52 are connected by electrical leads (M, $C_1$, $C_2$ and P) through apertures in the housing to the main winding terminal M, the capacitor terminals $C_1$ and $C_2$, and the power source terminal P, respectively.

Importantly, the capacitor spring contact 50, which is connected to terminal $C_2$, is positioned 90 degrees from the first capacitor spring contact 48, which is connected to capacitor terminal $C_1$. Also importantly, the power source spring contact 52, which is connected to the power source terminal P, is positioned appreciably less than ninety degrees from the second capacitor spring contact 50. As described below in great detail, this specific spacing of spring contacts 48, 50 and 52, in relation to the 90 degree spacing of tabs 40, 42 and 44, results in the discharging of the capacitors 22 and 24 during switching of the switch 16 from one position to another.

Figure 3A:
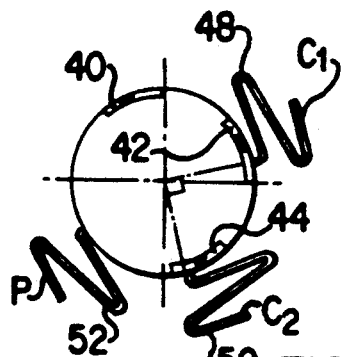
FIGS. 3A and 3B are a diagrammatic diagram illustrating the switch in the "off" position and a schematic diagram illustrating the motor circuit.
Figure 3B:
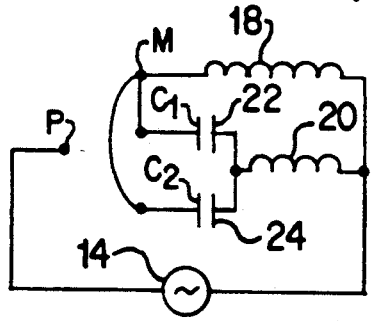

Specifically, as shown in FIG. 3A, when the switch 16 is in its "off" position, the capacitor spring contacts 48 and 50 are contacting tabs 42 and 44, thereby resulting in the capacitor terminals $C_1$ and $C_2$ being shorted with the main winding terminal M, as shown in FIG. 3B.

Figure 4A:
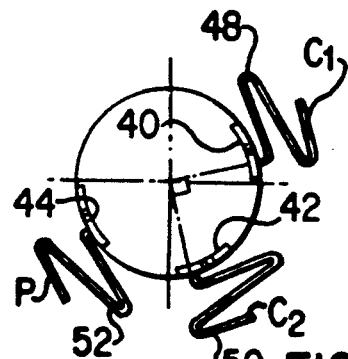
FIGS. 4A and 4B are diagrammatic and schematic diagrams illustrating the switch in its "high" speed position, and the circuit formed thereby.
Figure 4B:
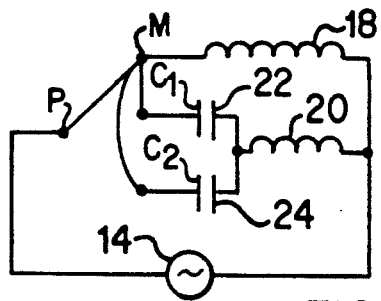

When the pull-chain 28 of the rotating mechanism 26 is pulled once, the shaft 30 and, correspondingly, the rotatable contactor 36 of the switch mechanism 32 is caused to rotate precisely 90 degrees, as shown diagrammatically in FIG. 4A. In this "high" speed position, the capacitor contacts 48 and 50 and the power source contact 52 are contacting all of the tabs 40, 42 and 44, thereby shorting together the power source terminal P, the main winding terminal M, and the capacitor terminals $C_1$ and $C_2$, as shown in FIG. 4B. Note that the capacitors 22 and 24 are connected in parallel, thereby adding their respective capacitance (e.g. 1.5 uf + 3.0 uf = 4.5 uf).

Figure 5A:
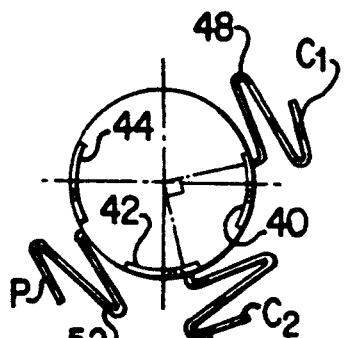
FIGS. 5A and 5B are diagrammatic and schematic views of the switch during switching from its "high" speed position to its "medium" speed position, and the circuit momentarily formed during such switching.
Figure 5B:
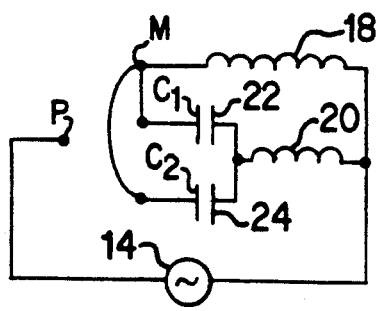

Referring to FIG. 5A, it is seen that immediately as the pull-chain 28 is pulled on again causing the rotatable contactor 36 to begin rotating again, tab 44 moves out from under contact with the power source spring contact 52 whereas tabs 40 and 42 move under, but remain in contact with the capacitor spring contacts of 48 and 50. This results in a disconnection of the power source 14 and a momentary shorting of the main winding terminal M with the capacitor terminals $C_1$ and $C_2$, as shown in FIG. 5B. During this momentary shorting of such terminals, it is seen that a closed-loop discharge path is formed through the main and auxiliary windings 18 and 20, thereby allowing the capacitors 22 and 24 to safely discharge through such path.

Figure 6A:
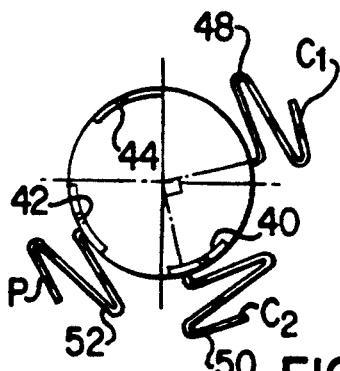
FIGS. 6A and 6B are diagrammatic and schematic diagrams of the switch in its "medium" speed position, and the circuit formed thereby.
Figure 6B:
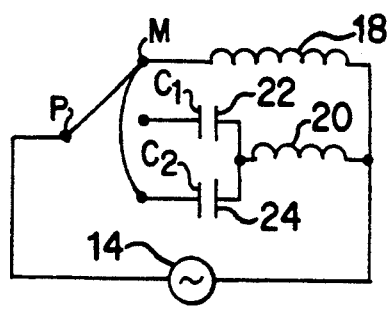

As shown in FIG. 6A, as the second pull on the pull-chain 28 is completed, the rotatable contactor 36 moves into its sequential 90 degree position from its former position shown in FIG. 4A. In this "medium" speed position, it is seen that the power source spring contact 52 is contacting tab 42 and the higher-value capacitor 24 is contacting tab 40, thereby resulting in the circuit shown in FIG. 6B.

Figure 7A:
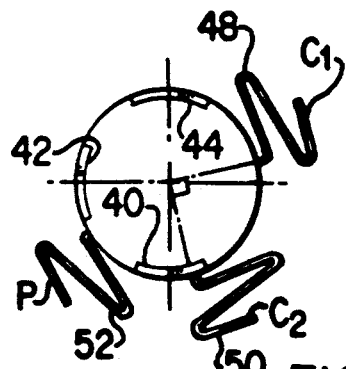
FIGS. 7A and 7B are diagrammatic and schematic diagrams of the switch during switching from its "medium" speed position to its "low" speed position, and the circuit momentarily formed during such switching.

Immediately upon pulling on the pull-chain 28 the third time, as shown in FIG. 7A, tab 42 is caused to move out from under contact with the power source spring contact 52 while the capacitor spring contact 50 remains in contact with tab 40. This results in a disconnection of the power source 14 and the momentary shorting of the capacitor terminal $C_2$ to the main winding terminal M, thereby creating a discharge path through the windings 18 and 20 allowing the higher-value capacitor 24 to safely discharge therethrough.

Figure 8A:
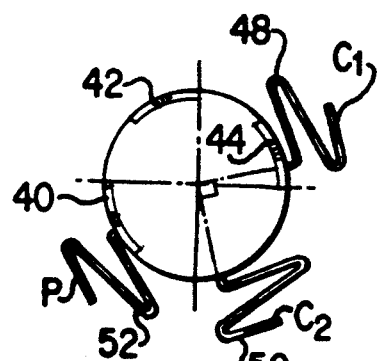
FIGS. 8A and 8B are diagrammatic and schematic diagrams of the switch in its "low" speed position and the circuit formed thereby.
Figure 7B:
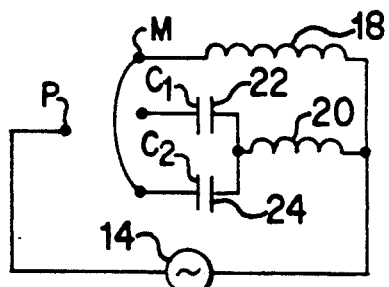
Figure 8B:
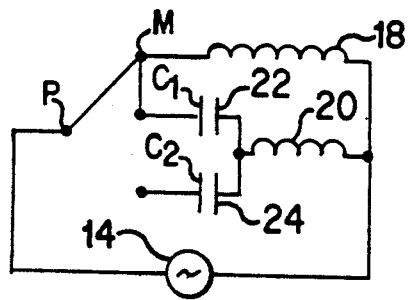

As the third pull on the pull-chain 28 is completed, the rotatable contactor 36 moves into the third 90 degree position as shown in FIG. 8A, which is ninety degrees from previous position shown in FIG. 6A. In this "low" speed position, the power source spring contact 52 is contacting tab 40 and the lower-value capacitor spring contact 48 is contacting tab 44. As shown in FIG. 8B, this results in the power source terminal P being shorted to the lower-value capacitor terminal $C_1$ and the main winding terminal M.

Figure 9A:
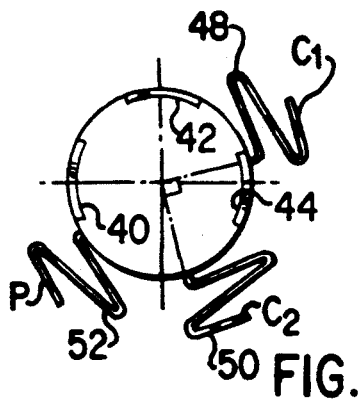
FIGS. 9A and 9B are diagrammatic and schematic diagrams of the switch being switched from its "low" speed position to its "off" speed position, and the circuit momentarily formed during such switching.
Figure 9B:
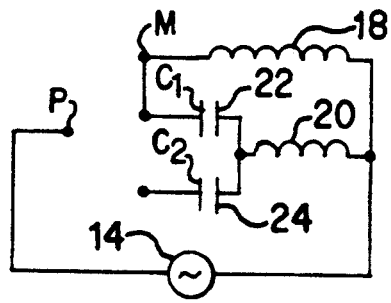

Finally, as shown in FIG. 9A, immediately upon pulling of pull-chain 28 for the fourth time, the rotatable contactor 36 is caused to rotate during which the tab 40 moves out from under contact with the power source spring contact 52 while tab 44 remains in contact with the capacitor spring contact 48. As shown in FIG. 9B, this results in the disconnection of the power source 14 and the momentary shorting of the lower-value capacitor terminal $C_1$ to the main winding terminal M. A closed-loop discharge path is therefore formed through the windings 18 and 20 allowing for the safe discharge of capacitor 22.

Figure 10A:
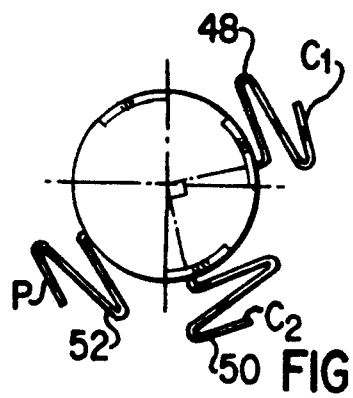
FIGS. 10A and 10B are diagrammatic and schematic diagrams of the switch in its "off" position and the circuit formed thereby.
Figure 10B:
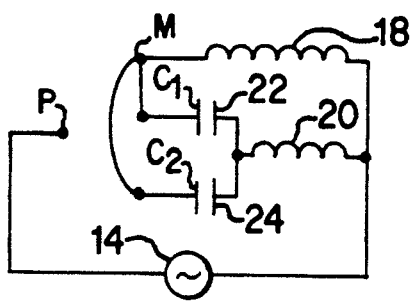

As shown in FIGS. 10A and 10B, upon completion of this fourth pull on the pull-chain 28, the rotatable contactor 36 is moved to its original "off" position.

From the foregoing, it should be readily appreciated that the unique method of this invention is the momentary shorting of the in-use capacitors 22 and/or 24 with the main winding terminal M during switching, to thereby form a closed-loop discharge path through the windings 18 and 20. This unique method of the invention is accomplished by the mechanical construction of the switch wherein the tabs 40-44 are positioned precisely 90 degrees apart and wherein the power source spring contact 52 is positioned appreciably less than 90 degrees from the higher-value capacitor spring contact 50.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

Now that the invention has been described,

What is claimed is:

1. A method for providing speed control of an induction motor including a main winding and an auxiliary winding and powered by a power source, comprising the steps of switching a capacitor in series with the auxiliary winding and connecting the power source across the serial connection of the capacitor and the auxiliary winding and across the main winding, and after such switching, disconnecting the power source therefrom and, during such disconnection, connecting the capacitor to the main winding, allowing such capacitor to discharge through the main winding and the auxiliary winding.

2. The method as set forth in claim 1, wherein the step of switching in the capacitor in series with the auxiliary winding comprises the step of selectively switching each of a plurality of capacitors in series with the auxiliary winding for achieving multi-speed operation of the motor and, in-between each such switching, disconnecting the power source from the capacitor in use and, during such disconnection, momentarily connecting such in-use capacitor to the main winding, allowing such in-use capacitor to discharge through the main winding and the auxiliary winding.

3. The method as set forth in claim 2, further comprises the step of connecting two of said capacitors in parallel with each other and then in series with the auxiliary winding such that during disconnection of the power source from the in-use paralleled capacitors, both of such in-use paralleled capacitors are momentarily connected to the main winding, allowing such in-use paralleled capacitors to discharge through the main winding and the auxiliary winding.

4. A multi-speed induction motor to be powered by a power source having a first terminal and a second terminal, comprising in combination:
   a main winding including a first terminal and a second terminal, said first terminal being connected to the first terminal of the power source;
   an auxiliary winding including a first terminal and a second terminal, said first terminal being connected to the power source;
   a plurality of first capacitors each including first terminals and second terminals, said first terminals being connected to said second terminal of said auxiliary winding;
   switch means connected to said second terminals of said capacitors, to said second terminal of said main winding, and to the second terminal of the power source, said switch means including means for selectively switching said capacitors in series with said auxiliary winding and for connecting the power source across said serial connection of said capacitors and said auxiliary winding and across said main winding for achieving multi-speed operation of the motor and, during each selective switching, for disconnecting the power source from each in-use said capacitor and, during such disconnection, momentarily connecting each in-use said capacitor to said main winding, allowing each in-use said capacitor to discharge through said main winding and said auxiliary winding.

5. The induction motor as set forth in claim 4, wherein said switch means comprises a rotary switch.

6. The induction motor as set forth in claim 5, wherein said rotary switch comprises in combination:
   a rotating mechanism including a central shaft which rotates 90 degrees upon each actuation thereof;
   a switch mechanism including
   a power source contact connected to the power source, a first capacitor contact connected to said second terminal of one of said capacitors having a high capacitance, a second capacitor contact connected to said second terminal of another of said capacitors having a low capacitance, and a main winding contact connected to said second terminal of said main winding, and
   a rotatable contactor positioned in contacting engagement with said contacts in such a manner that, when said switch mechanism is in an "off" speed position, said second terminal of said main winding and said second terminals of said capacitors are shorted to the second terminal of the power source, when said switch mechanism is in a "high" speed position, said second terminals of said capacitors and said second terminal of said main winding, are shorted to the second terminal of the power source, when said switch mechanism is in a "medium" speed position, said second terminal of a higher-value said capacitor and said main winding terminal are shorted to the second terminal of the power source, and when said switch mechanism is in a "low" speed position, said second terminal of a lower-value said capacitor and said second terminal of said main winding are shorted to the second terminal of the power source.

7. The induction motor as set forth in claim 6, wherein said switch mechanism of said rotary switch rotates said rotatable contactor 90 degrees during each actuation.

8. The induction motor as set forth in claim 7, wherein said rotatable contactor comprises an electrically conductive strip positioned about its circumference in engagement with said power source contact and including three tabs positioned about another portion of the circumference of said contactor, the second and third tab being positioned 90 degrees from the first and second tabs, respectively.

9. The switch as set forth in claim 8, wherein said second capacitor contact is positioned 90 degrees from said first capacitor contact and wherein said power source contact is positioned appreciably less than 90 degrees from said second capacitor contact.

* * * * *